United States Patent [19]

Deguchi et al.

[11] Patent Number: 4,774,593
[45] Date of Patent: Sep. 27, 1988

[54] IMAGE FORMING APPARATUS

[75] Inventors: Yutaka Deguchi; Hideo Momohara; Yasuyuki Tsuchida, all of Hyogo, Japan

[73] Assignee: Sanyo Electric Co., Ltd., Japan

[21] Appl. No.: 852,825

[22] Filed: Apr. 16, 1986

[30] Foreign Application Priority Data

| Apr. 19, 1985 | [JP] | Japan | 60-085022 |
| Jun. 17, 1985 | [JP] | Japan | 60-131286 |
| Jun. 19, 1985 | [JP] | Japan | 60-133381 |
| Jun. 20, 1985 | [JP] | Japan | 60-134737 |
| Jul. 17, 1985 | [JP] | Japan | 60-157302 |
| Dec. 20, 1985 | [JP] | Japan | 60-288675 |
| Dec. 28, 1985 | [JP] | Japan | 60-298234 |

[51] Int. Cl.$^4$ .............. G03G 21/00; H04N 1/27; G01D 15/06
[52] U.S. Cl. .............. 358/301; 346/160; 355/3 R; 355/39
[58] Field of Search .............. 355/3 R, 6, 7, 39, 40, 355/133; 358/300, 301; 346/160

[56] References Cited

U.S. PATENT DOCUMENTS

| 3,749,833 | 7/1973 | Rait et al. | 358/300 X |
| 3,792,913 | 2/1974 | Simmons | 355/7 |
| 3,827,799 | 8/1974 | Koizumi | 355/7 X |
| 3,878,367 | 4/1975 | Fayling et al. | 355/133 X |
| 4,073,585 | 2/1978 | Kobayashi et al. | 355/14 SH |
| 4,173,406 | 11/1979 | Oyama et al. | 355/7 X |
| 4,362,502 | 12/1982 | Motomura et al. | 355/3 F UX |
| 4,498,107 | 2/1985 | Yoshimaru et al. | 358/301 X |
| 4,551,008 | 11/1985 | Banton | 355/40 X |
| 4,573,084 | 2/1986 | Iida | 358/300 |

Primary Examiner—Fred L. Braun
Attorney, Agent, or Firm—Darby & Darby

[57] ABSTRACT

An image forming apparatus utilizes a paper which has a part capable of recording a visible image on the surface thereof and a part capable of recording magnetic information thereon. A toner image is formed on the visible image recording part of the paper by a photosensitive drum, a developing apparatus and a transferring device. A magnetic information signal is recorded on the magnetic recording part of the paper by a magnetic record head. A discharging device is provided for discharging the paper on which both a visible image and magnetic information are recorded.

43 Claims, 16 Drawing Sheets

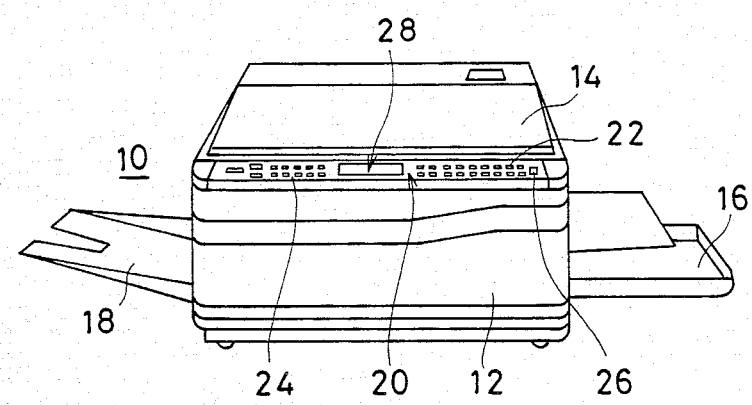
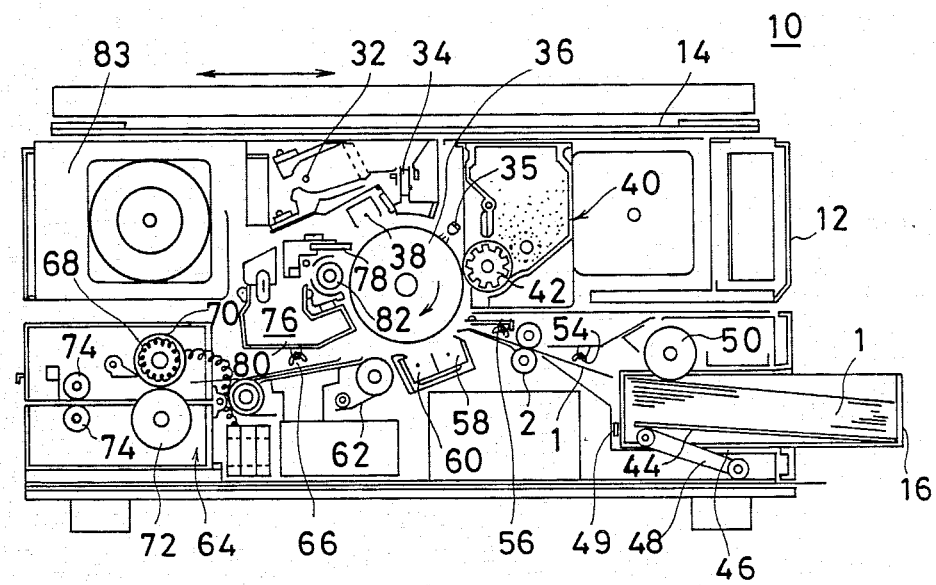
FIG. 2

F I G. 19 B
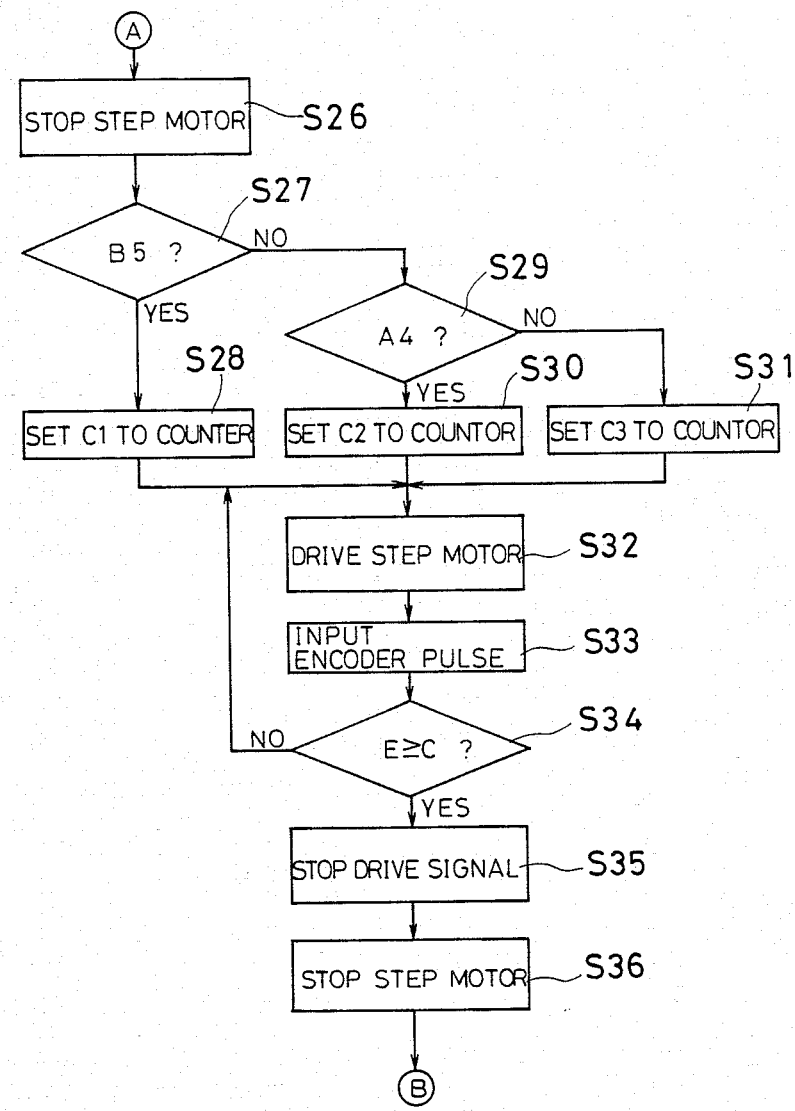

IMAGE FORMING APPARATUS

BACKGROUND OF THE INVENTION

1. Field of the Invention

The present invention relates to an image forming apparatus. More specifically, the present invention relates to an image forming apparatus such as an electrophotographic copying machine, a non-impact printer, a facsimile or the like.

2. Description of the Prior Art

Conventionally, image forming apparatus such as the electrophotographic copying machine, the printer and the like are known. Such an image forming apparatus simply forms a visible image on the surface of a paper.

On the other hand, cash cards, various kinds of tickets for trains, airplanes and the like and price tags are known as papers comprising a magnetic recording part. All of these are prepared for specific applications.

The conventional papers whereon the magnetic recording part is formed are limited in the outside dimensions thereof, and are restricted in the kind and size of an image such as a character or a figure which can be recorded in a visible fashion. Such items are therefore unusable for an image forming apparatus which records an arbitrary visible image such as the electrophotographic copying apparatus.

Heretofore image forming apparatus has not been available for providing magnetic recording in a manner so that information relating to a confidential matter is made invisible in addition to forming an arbitrary visible image such as a character and a figure on the paper.

SUMMARY OF THE INVENTION

Therefore, a principal object of the present invention is to provide a quite novel image forming apparatus.

Another object of the present invention is to provide an image forming apparatus which can form an arbitrary image such as a character or a figure in a visible fashion and also can magnetically record additional information.

The present invention can utilize a paper having a visible image recording part and a magnetic recording part. This means that to be brief, the present invention relates to an image forming apparatus which provides a visible image recording means for recording a visible image on the visible image recording part of the paper being transferred and a magnetic recording means for recording a magnetic information signal on the magnetic recording part of the paper being transferred.

By utilizing an image forming apparatus in accordance with the present invention, a visible image is recorded on the surface of the visible image forming part of the paper, and also additional information is recorded magnetically on the magnetic recording part in an invisible fashion. This magnetic recording part can be utilized for recording information relating to a confidential matter or information required for mechanical processing such as sorting or retrieving the paper whereon a visible image is formed and the like.

In accordance with the present invention, a visible image of an arbitrary size such as a character or a figure can be recorded on the paper, and also additional information associated with the visible image can be recorded in a form of an invisible magnetic signal. Accordingly, in an image forming apparatus in accordance with the present invention, the range of utilization or application is expanded in comparison with that of the conventional electrophotographic copying machine or printer, and new applications which have not existed previously can be provided.

In accordance with a preferred embodiment of the present invention, the visible image recording means comprises a latent image forming means for forming a latent image according to a visible image, a developing means for developing this latent image into a toner image, a transferring means for transferring the toner image onto the visible image recording part of the paper, and a fixing means for fixing the transferred toner image onto the visible image recording part.

The latent image forming means comprises a light source for exposing an original and a photosensitive body receiving a light image reflected from the original, that is, an original image. For another example of the latent image forming means, an array or a head of light emitting elements is used which can irradiate the light image intact onto the photosensitive body. In the case where such an array or head of light emitting elements is utilized, an electric signal according to the visible image to be formed will be generated for driving the array or head.

In another preferred embodiment in accordance with the present invention, a demagnetizing means is disposed upstream from the magnetic recording means, and thereby the magnetic recording part of the paper is demagnetized before magnetic information is written. If a reading means for reading magnetic information which has already been written is installed, the image forming apparatus is able to perform processing according to the information read by itself. In this case, such a reading means will be required to be disposed upstream from the erasing means.

These objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 1 is a front perspective view showing one example of an electrophotographic copying machine embodying the present invention.

FIG. 2 is an illustrative structural view showing the inner structure of the electrophotographic copying machine as shown in FIG. 1.

FIG. 19A and FIG. 19B are flowcharts showing an operation in the case of magnetically recording additional information on the magnetic recording part of different paper size.

DESCRIPTION OF THE PREFERRED EMBODIMENTS

Figure 3:
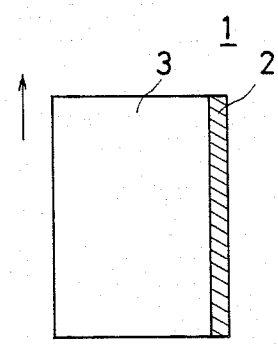
FIG. 3 is a plan view showing one example of a paper applicable to the present invention.

FIG. 1 illustrates an electrophotographic copying machine embodying the present invention. An electrophotographic copying machine 10 comprises a main unit 12. An original table 14 is installed on the top surface of the main unit 12. This original table 14 is supported so as to be movable rightward and leftward. At one end of the main unit 12, a paper feeding part for loading a paper feeding cassette 16 in a freely attachable/detachable manner is formed. At the other end of the main unit 12, a paper receiving part comprising a paper receiving tray 18 is formed. Accordingly, an original placed on the original table 14 is recorded on a paper 1 fed from the paper feeding cassette 16 and is discharged onto the paper receiving tray 18.

An operation panel 20 is formed on the top surface of the main unit 12. Ten-keys 22, a group of select keys 24 and a start key 26 are installed on this operation panel 20. The ten-keys 22 is utilized for setting the copy quantity. As described in detail in reference to FIG. 8 later, the group of select keys 24 comprises a plurality of keys which are utilized for selecting the kind of additional information to be recorded mgnetically on a magnetic recording part 2. The start key 26 is utilized for commanding copy start.

Furthermore, a display panel 28 composed, for example, of a liquid crystal display or the like is formed on the operation panel 20. As described in detail in reference to FIG. 7 later, this display panel 28 comprises a 7-segment indicator for displaying a desired copy quantity or the kind of additional information by code. Next, a detailed description is given of the inner structure of the electrophotographic copying machine 10 with reference to FIG. 2.

The original table 14 is installed on the top surface of the main unit 12 so as to be capable of moving on the top surface rightward and leftward. This original table 14 is composed, for example, of a transparent glass plate. On the top surface thereof, an original cover 30 is mounted so as to be capable of opening and closing. A slit is formed on the top surface of this main unit 12. A light source 32, such as a halogen lamp, is associated with the slit and is fixedly installed in the main unit 12. A reflecting mirror having an elliptic cross-section is installed in association with the light source 32. Light from the light source 32 is reflected by the reflecting mirror illuminates an original placed on the original table 14. Accordingly, in response to a movement of the original table 14 in the direction as shown by the double-ended arrow arrow, the original receives the light from the light source 32 through the above-described slit and reflects it. The light reflected from the original, that is, an original image, is projected on a photosensitive drum 36 through a short focal length lens array 34 installed under the slit in a fixed fashion to produce an image. This short focal length lens array 34 is composed of a convergent photoconductor wherein a large number of rod lenses are closely arranged.

Such a short focal length lens array 34 may be replaced with a plastic lens or convex lens.

The photosensitive drum 36 is disposed at nearly the center of the main unit 12 and is rotated in the direction as shown by an arrow (clockwise) in synchronism with the movement of the original table 14 by a driving source (not illustrated). This photosensitive drum 36 comprises a conductive substrate and a photoconductive layer composed of amorphous silicon which is formed thereon in a laminated fashion.

A charging corotron 38 for uniformly positive-charging (about 600 V) the photosensitive drum 36 is mounted in a fixed fashion upstream from the short focal length lens array 34 in the direction of rotation of the photosensitive drum 36. An electrostatic latent image of the original is formed on the photosensitive drum 36 by this charging corotron 38, the light source 32, the short focal length lens array 34 and the original placed on the original table 14.

A developing device 40 for developing the electrostatic latent image by toner is installed downstream from the short focal length lens array 34 in the vicinity of the circumferential side face of the photosensitive drum 36. A mixture of toner and carrier is stored in this developing device 40. This mixture is caused to fly toward the photosensitive drum 36 by a magnet roller 42. At this time, a crest of the mixture is formed at a part of the magnet roller 42 facing the photosensitive drum 36. An end of this crest contacts the photosensitive drum 36, and thereby the negatively charged toner adheres to the electrostatic latent image formed by positive charges. Thus, the electrostatic latent image formed on the photosensitive drum 36 is developed as a toner image by the developing apparatus 40.

The paper 1 is stored in a stacked manner in the paper feeding cassette 16 which is loaded at one end of the main unit 12 in a free insertion/removal manner. A supporting plate 44 for supporting the paper 1 thereon is installed at the bottom part of the paper feeding cassette 16 and is free to sway up and down. An opening 46 is formed at the lower part of the supporting plate 44. A free end of a push-up lever 48 whose base end is attached to the inner bottom part of the main unit 12 in a free sway fashion is inserted through this opening 46. Associated with this push-up lever 48, a spring (not illustrated) for rotationally energizing the pushup lever 48 clockwise is installed. The supporting plate 44 is pushed upward by this push-up lever 48. Accordingly, the paper 1 stored in the paper feeding cassette 16 in a stacked fashion is pushed up by the push-up lever 48. The uppermost sheet of paper 1 is brought in contact with a paper feeding roller 50, for feeding the sheets out of the stack. A paper size sensor 49 associated with the paper feeding cassette 16 is installed as required.

A register roller 52 is installed behind the paper feeding roller 50. The paper 1 fed from the paper feeding cassette 16 is stopped by this register roller 52 and, thereafter is sent toward the photosensitive drum 36 in synchronism with the movement of the original table 14. Meanwhile, a magnetic reader 54 is installed between the paper feeding roller 50 and the register roller 52 on the path transferring the paper 1, and a demagnetizer 56 is installed between the register roller 52 and the photosensitive drum 36. Detailed description thereof is made later in reference to FIG. 6.

A transferring corotron 58 for transferring the toner image developed by the developing device 40 onto the paper 1 is installed at the position where the paper 1 is fed from the register roller 52 in the vicinity of the circumferential side face of the photosensitive drum 36. A separating corotron 60 is installed integrally with the transferring corotron 58. The separating corotron 60 imparts an AC corona discharge to the paper 1 after the toner image formed on the photosensitive drum 36 is transferred. The resulting neutralization of charge prevents the paper 1 and the toner image formed thereon from absorbing residual charges from the photosensitive drum 36.

A vacuum conveyor 62 for transferring the paper 1 on which the toner image is transferred is installed downstream from the separating corotron 60. The paper is transferred toward a fixing device 64 by this vacuum conveyor 62. A magnetic writer 66 as described in detail in reference to FIG. 6 later is installed on the conveying path of the vacuum conveyor 62.

Figure 5:
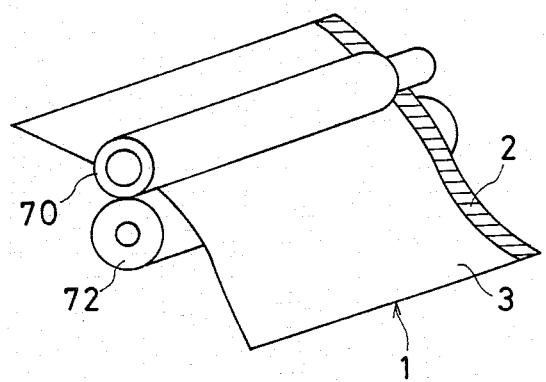
FIG. 5 is a perspective view of the major part showing one example of a fixing device.

The fixing device 64 comprises a heating roller 70 incorporating a heater 68 and a pressing roller 72 brought in press-contact with the heating roller 70. As shown in FIG. 5, one end part of the heating roller 70 in the axial direction is formed in a terraced shape to prevent the magnetic recording part 2 formed on the paper 1 from being heated and pressed. An image recording part 3 of the paper 1 on which the toner image is transferred is inserted between the heating roller 70 and the pressing roller 72, thereby being heated and pressed. Thus, the toner image is fixed. A paper discharging roller 74 for discharging the paper 1 onto the paper receiving tray is installed downstream from this fixing device 64.

A cleaning device 76 is installed above the abovedescribed vacuum conveyor 62 and in the vicinity of the circumferential side face of the photosensitive drum 36. This cleaning device 76 removes the toner remaining on the photosensitive drum 36 without transferring any toner onto the paper 1. The cleaning device 76 comprises a blade 78 for scraping off the toner remaining on the photosensitive drum 36 and a screw conveyor 82 for transferring the toner scraped off by the blade 78 to a toner receiving container 83.

Figure 11:
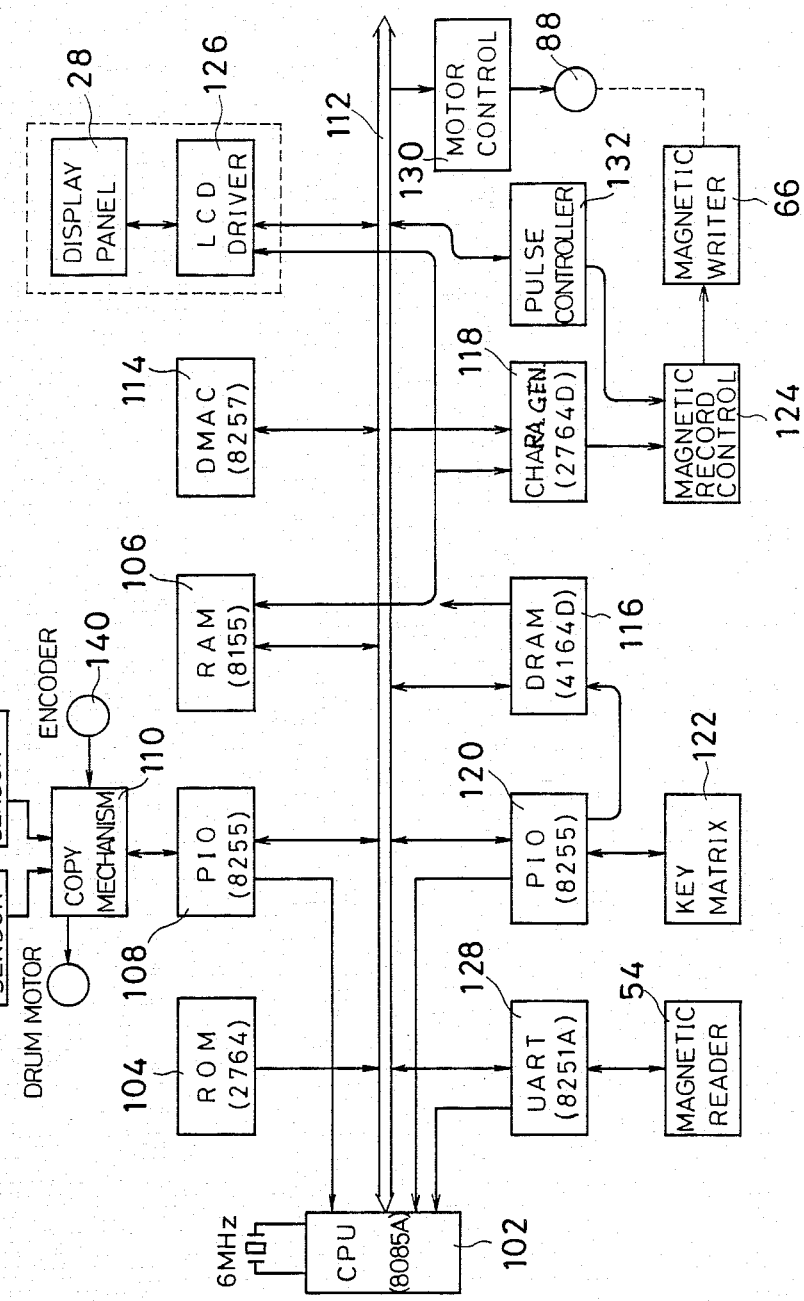
FIG. 11 is a block diagram showing one example of a controlling system of the electrophotographic copying machine as illustrated in FIG. 1.

In order to control operation of the whole of such a copying machine and to control magnetic recording of additional information on the magnetic recording part 2 or to control reading of the magnetic-recorded information, a control box 83 is provided. Various components required for a control system as shown for example in FIG. 11, are accommodated in this control box 83.

FIG. 3 is a plan view showing one example of the paper applied to the present invention. This paper 1 can be utilized as the paper for recording various kinds of images, for example, a paper for the electrostatic recording type printer or thermal printer besides the above-described electrophotographic copying machine.

For the paper 1, plain paper, thermosensitive paper, photosensitive paper or the like is used, and the magnetic recording part 2 is formed along the end of one side thereof. As to the method of forming this magnetic recording part 2, this part may be formed by various methods. As is described later in reference to FIG. 28 through FIG. 32, a belt-shaped magnetic tape is bonded to the paper 1 with an adhesive or the like, or bonded by heat, or a paint of magnetic material is coated or the like. The magnetic recording part 2 is formed, for example, along the direction of advance of the paper 1 when the image is copied on the remaining image recording part 3 of the paper 1 by the copying machine.

The magnetic recording part 2 is formed along the end of one side of the paper 1 to avoid hindering formation of the image on the paper 1 and to prevent heating by a heating roller 70 in the fixing device Also, the magnetic recording part 2 is formed along the direction of advance of the paper 1 so that information to be invisibly recorded can be magnetically recorded simultaneously with recording of the image in a visible fashion, and thereby the movement of the paper 1 or the movement of the magnetic recording device (refer to FIG. 6) is simplified.

Figure 4:
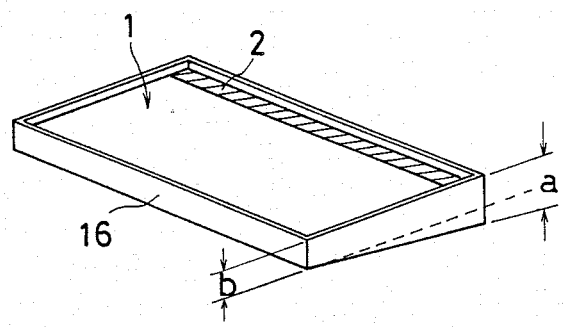
FIG. 4 is a perspective view of a paper feeding cassette for storing the paper as illustrated in FIG. 4.

As shown in FIG. 4, the paper feeding cassette 16 is so chosen that the height a of the side where the magnetic recording part 2 is formed is greater than the height b of the opposite side where the magnetic recording part 2 is not formed. This means that the bottom surface of cassette 16 is formed in a slanting fashion so that the paper of the top layer will lie in a predetermined plane despite the thickness of the magnetic recording part 2 when the paper 1 as shown in FIG. 1 is stacked.

Figure 6:
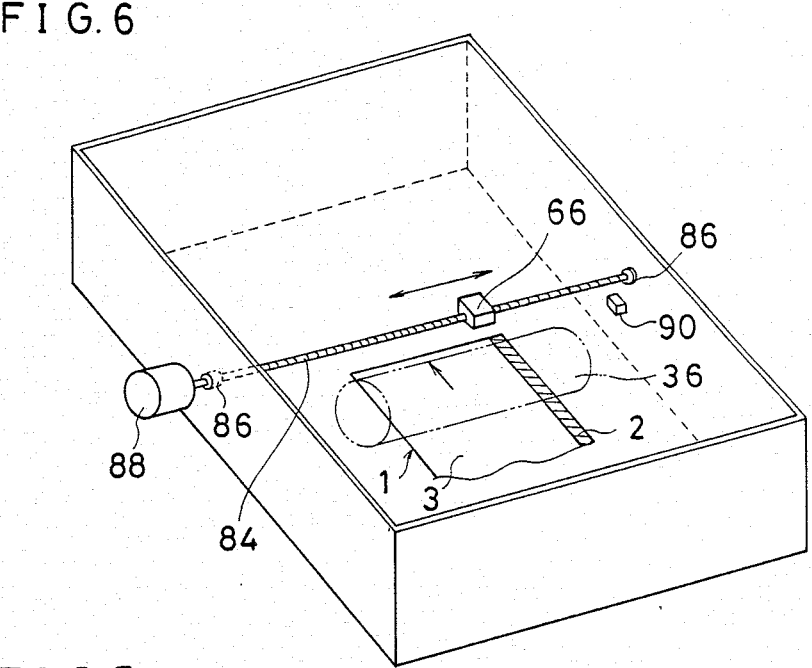
FIG. 6 is a perspective view showing details of a magnetic recording device.

Referring to FIG. 6, the magnetic writer 66 has a through screw hole, and is supported by inserting a lead screw 84 into this screw hole. The magnetic writer 66 can be moved in the axial direction by rotating the lead screw 84. This lead screw 84 is positioned between the above-described separating corotron 60 and fixing device 64 as shown in FIG. 2. Each end of lead screw 84 is supported by a supporting part 86 in the direction orthogonal to the direction of transferring the paper 1, that is, in the direction parallel to the axial direction of the photosensitive drum 36. One end of the lead screw 84 is coupled to a rotary shaft of a stepping motor 88. In response to a detection output from the paper size detector 49 (FIG. 2), the stepping motor 88 is driven, and the magnetic writer 66 is positioned so as to face the magnetic recording part 2 of the paper 1 which is being transferred. Furthermore, in order to detect that the tip of paper 1 has come to the position of the magnetic writer 66, a position detector 89 is provided.

Although not illustrated in FIG. 6, the demagnetizer 56 and the magnetic reader 54 are also supported so as to be movable in the direction orthogonal to the direction of transferring the paper in a manner similar to the magnetic writer 66.

Figure 7:
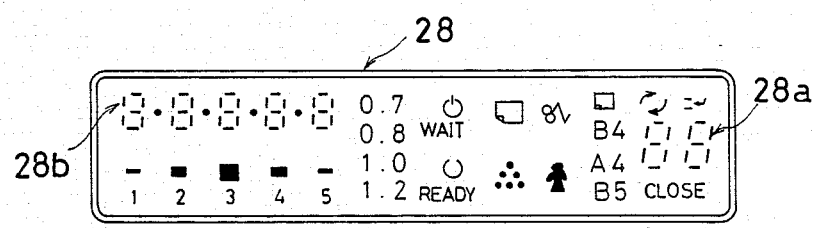
FIG. 7 is an illustrative view showing one example of a displaying panel.

Referring to FIG. 7, the display panel 28 comprises a numeric value displaying part 28a for displaying the copy quantity which is set through the ten-keys 22 (FIG. 1) and a number displaying part 28b for displaying the number or code which designates the kind of additional information selected by the group of select keys 24 (FIG. 1). These two displaying parts 28a and 28b each comprise 7-segment indicators, respectively. In a typical sequence of operations, when key 243 is depressed after, for example, a key 24a in the group of select keys 24 is depressed, "3" is displayed on the 7-segment indicator at the left end of the number displaying part 28b. In a similar manner, the numbers of the other keys which are operated are displayed in sequence by the 7-segment indicator (see FIG. 10).

Figure 10:
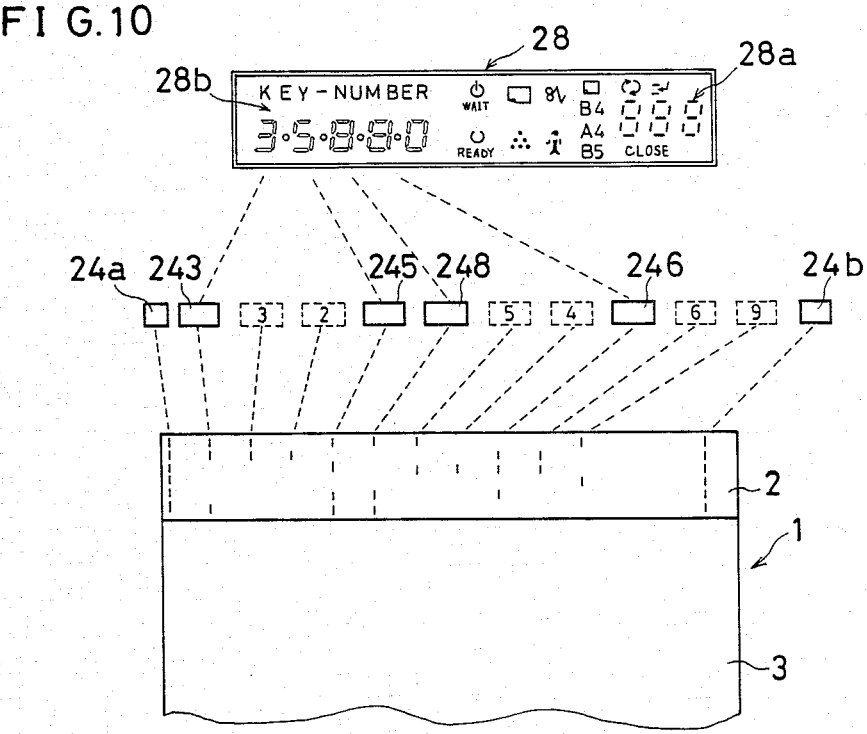
FIG. 10 is an illustrative view showing an example of operation of the group of select keys and a relationship between display of the displaying panel responding thereto and record of the paper.

As shown in FIG. 10, display characters representing the paper size, image density and the like required for the normal electrophotographic copying machine are formed in addition to these 7-segment indicators 28a and 28b.

Figure 8:
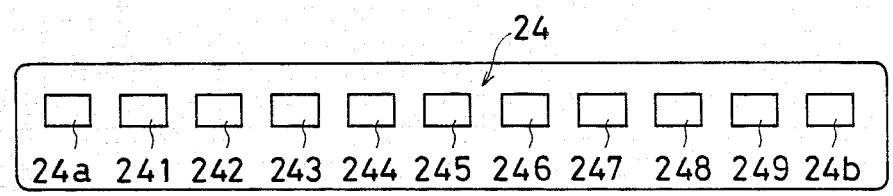
FIG. 8 is an illustrative view showing one example of arrangement of a group of select keys for selecting the kind of additional information.

The group of select keys 24, as shown in detail in FIG. 8, comprises a plurality of keys (11 keys in the illustrated example). The first key 24a is utilized for commanding magnetic recording of additional information on the magnetic recording part 2 of the paper 1 using the group of select keys 24. The last key 24b is utilized for signaling an end to the operation of selecting the kind of additional information. In order to select nine kinds of additional information, nine select keys 241 through 249 are provided.

Figure 9:
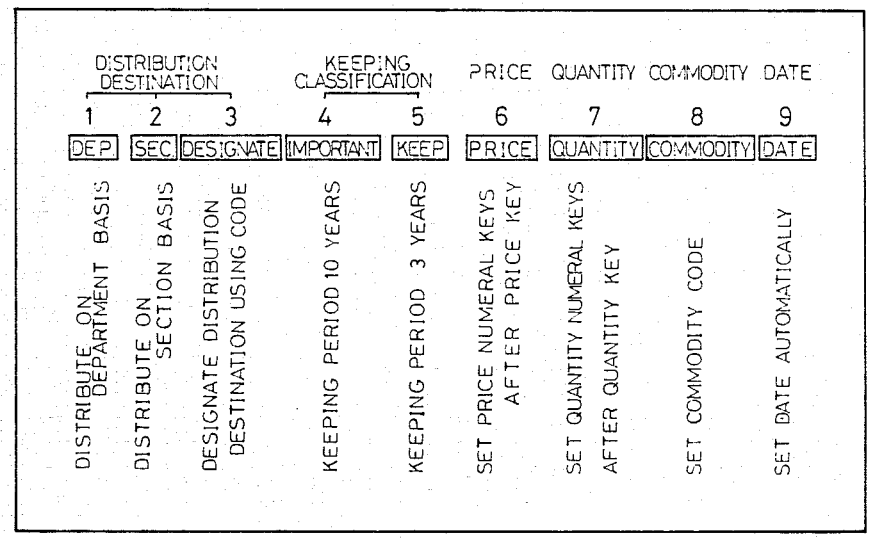
FIG. 9 is an illustrative view showing one example of the content of information to be magnetic-recorded on a magnetic recording part in response to an operation of the group of select keys.

FIG. 9 is an illustrated view showing one example of the content of information to be magnetic-recorded on the magnetic recording part in response to operation of the group of select keys. The group of select keys 241 through 243 is utilized for commanding the destination to which the paper 1 is to be distributed. In particular the key 241 commands distribution on a department basis, the key 242 commands distribution on a section basis, and the key 243 commands that the destination of distribution be specified by code. Note that when the destination of distribution is specified by code, the code number of the destination of distribution is entered by operating the ten-keys 22 after operating the key 243. The keys 244 and 245 are utilized for commanding the retention of classification of the paper 1. In particular the key 244 is used for example, for an important copy the retention period for which is long (e.g. 10 years). The key 245 is used for where a copy need be kept for a short period (e.g. three years). The keys 246, 247 and 248 are used for setting price, quantity and commodity respectively. The code of price, quantity or commodity is entered by operating the ten-keys 22 after each key is depressed. The key 249 is used when a date is magnetically recorded. When this key 249 is operated, the date is set automatically. The additional information specified by operating the group of select keys 24 is magnetically recorded on the magnetic recording part 2 of the paper 1.

FIG. 10 illustrates the a relationship between one example of key operation for inputting additional information, the corresponding display on the display panel and the corresponding magnetic recording on the paper. For example, when the key 243 is depressed, "3" is displayed at the most significant digit of the 7-segment indicator 28b. At this time, all digits of the 7-segment indicator 28a display 0. Since "3" is the key for entering the code of the destination of distribution, thereafter "32" which is the code number of destination of distribution of for example, the "sales department" is entered by operating the ten-keys 22. This code number "32" is displayed as "032" by the 7-segment indicator 28a. Next, when the key 245 showing that the retention period is three years is depressed, a number "5" is displayed at the second from the most significant digit of the 7-segment indicator 28b. Next, when the key 248 for specifying the commodity code is depressed, a number "8" is displayed at the third from the most significant digit of the 7-segment indicator 28b. Next, when a code showing the type name of the commodity, for example, "SFT-1000", for example "54" is inputted the commdity code "054" is displayedon the 7-segment indicator 28a. Next, when the key 246 for the price is depressed, "6" is displayed at the fourth from the most significant digit of the 7-segment indicator 28b, and furthermore "069" showing the price of, for example, 690,000 yen is displayed in the 7-segment indicator 28a by operating the ten-keys 22.

Thus, after the information to be recorded on the magnetic recording part 2 in a mechanically readable and invisible fashion is entered, the copy quantity is set by operating the ten-keys 22. Till then, the states of display of the 7-segment indicators 28a and 28b are retained. Then, the additional information thus entered is magnetically recorded on the magnetic recording part 2 in matching relationship with the images copied on the paper 1. That is, the original image associated with the magnetic recording information is copied on the image recording part 3 of the paper 1.

Meanwhile, it is needless to say that since the content of the original image differs depending upon the application, the image may be different from the content of the magnetic record of the magnetic recording part 2.

FIG. 11 is a block diagram showing one example of a control system. The control system comprises an 8-bit CPU 102, for example, the μPD8085AC/D-2 manufactured by NEC. A ROM 104 storing a control program and the like and a RAM 106 which temporarily stores data under control of the CPU 102 are connected to CPU 102. RAM 106 has an area for various flags and an area for counters which are required for control. For the ROM 104, for example, the μPD2764D manufactured by NEC is used, and for the RAM 106, the μPD8155HC manufactured by NEC is used.

A programmable input/output interface (PIO) 108 is provided to make up for the shortage of I/O ports of the CPU 102. This PIO 108 works as an input/out port for a copy mechanism part 110 controlled by the CPU 102 and the ROM 104. For this PIO 108, for example, the μPD8255AC/D-2 manufactured by NEC can be used. All controlling mechanisms of the part relating to the operation of the electrophotographic copying machine are collected in the copy mechanism part 110.

The above-described components are connected by a bus 112 together with the CPU 102 and the other components. This bus 112 comprises an address bus, a data bus and a control bus.

A direct memory access controller (DMAC) 114 is connected to the bus 112. The DMAC 114 selects the content stored in a dynamic RAM (DRAM) 116 without mediation of the CPU 102, and gives it directly to a character generator 118. The character generator 118 is composed, for example, of an EPROM, and generates a magnetic write signal based on the character code representing the information or the content sent from the DRAM 116. Accordingly, the magnetic writer 66 records a magnetizing signal in response to the content of the character generator 118, that is, the DRAM 116 on the magnetic recording part 2.

In addition, for the DMAC 114, for example, the μPD8257C/D-2 manufactured by NEC can be used, and for the character generator 118, for example, the μPD2764D manufactured by NEC can be used.

Furthermore, a key-matrix 122 is connected to the bus 112 through a PIO 120. This PIO 120 is an I/O port similar to the previous PIO 108. The respective keys as described in reference to FIG. 2 and FIG. 8 are connected to the key-matrix 122. Accordingly, the key-matrix 122 receives operation signals from not only the operation keys for the electrophotographic copying machine 10 but also the key group 24 for selecting additional information, and gives key code signals to the CPU 102 through the PIO 120.

Figure 18:
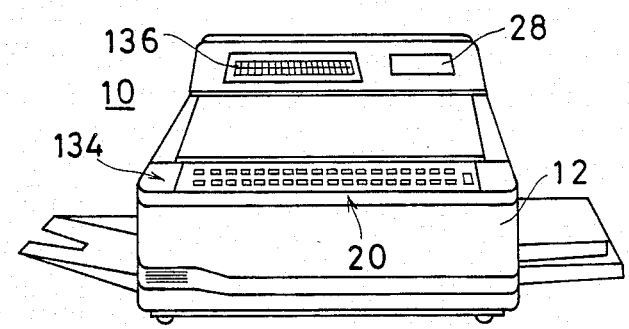
FIG. 18 is a front perspective view showing one example of an electrophotographic copying machine including a word processing function embodying the present invention.

The previous DRAM 116 temporarily stores the key code representing the kind of additional information selected by the group of select keys 24. This key code is stored as 8-bit data. Specifically, for example, when any one of select keys is operated, the key code representing this key is stored in the DRAM 116. From this DRAM 116, the character code of additional information corresponding to the operated key is outputted, and this character code selects the address of the character generator 118, and outputs the character in sequence, and this is given to a magnetic record control circuit 124. Accordingly, the DRAM 116 comprises a conversion part which can output in sequence the codes of the characters constituting the additional information based on the key code of a single digit representing the kind of the additional information. However, such a conversion part will not be required in the case of the electrophotographic copying machine having a so-called word processing function as shown in FIG. 18 later.

An LCD driver 126 display-drives, for example, the display panel or the LCD 28 as shown in FIG. 7. Meanwhile, for such a display panel 28, a dot-matrix type display may be used.

An UART (Universal Synchronous/Asynchronous Receiver/Transmitter) 128 acts as a serial-parallel conversion decoder for exchanging signals with the outside. The μPD8251AFC/D manufactured by NEC can be utilized for UART 128. This UART 128 is used advantageously where the means for inputting additional information is, for example, a magnetic card or a magnetic recording part of another copy paper. The magnetic reader 54 then reads data recorded on the magnetic recording part 2 of another copy paper or the like, and converts the read signal to a display on the display panel 28.

A motor control circuit 130 is utilized for controlling the stepping motor 88 a shown in FIG. 6, and a pulse controller 132 is utilized for controlling writing of the magnetic signal by the magnetic record control circuit 124, particularly the speed thereof or the like.

Figure 12:
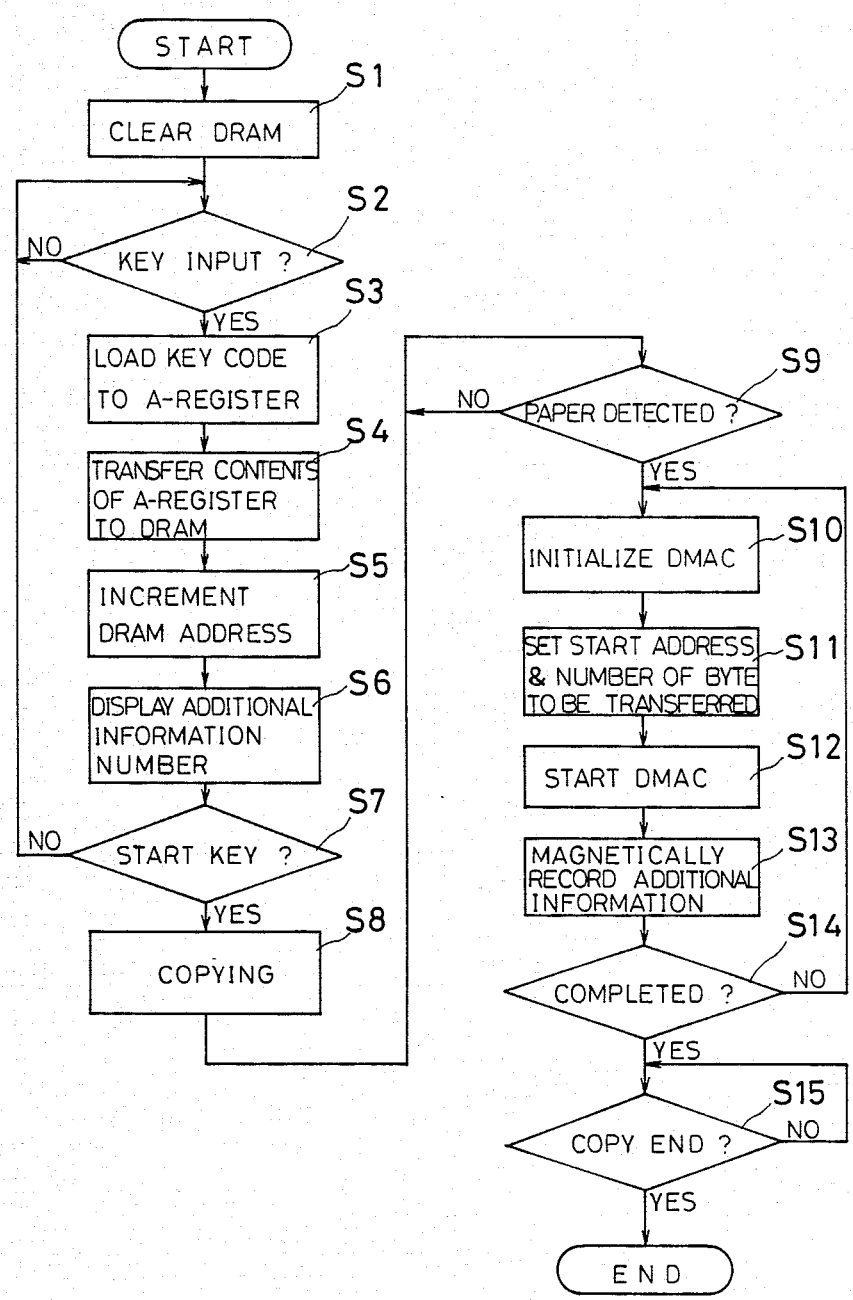
FIG. 12 is a flowchart showing an operation for magnetic-recording additional information.

Referring next to the flowchart shown in FIG. 12 in connection with FIG. 11, since the operation of a normal electrophotographic copying machine is well known, the following description will relate principally to the controls required for magnetic-recording additional information on the magnetic recording part 2.

In the first step S1, the CPU 102 clears the DRAM 116. Subsequently in step S2, a determination is made as whether or not an input has been provided from the key-matrix 122, that is, a key has been operated based on the signal from the PIO 120. If the key has been operated, in the next step S3, the key code responding to the operated key among the select keys 241 through 249 (refer to FIG. 8) is loaded in an A-register in the CPU 102. In step S4, the content of the A-register, that is, the key code corresponding to the selected key is transferred to the DRAM 116. Accordingly, in the next step S5, the address of the DRAM 116 storing the code of each character constituting the additional information corresponding to the operated select key is specified, and the additional information is outputted. In step S6, this key code, that is, the number of the kind of additional information is displayed on the number displaying part 28b of the display panel 28.

In the following step S7, if it is detected that the start key 26 has been operated, then, in step S8, the copy mechanism part 110 will be driven to execute the normal copying operation.

In the next step S9, a determination is made as to whether or not a position detector 90 has detected the tip of the paper 1. If it is determined that the paper 1 is present, then, in step S10, the DMAC 114 is initialized. In the following step S11, a start address for the DMA from the DRAM 116 to the character generator 118 and the number of transfer bites are set.

In the following step S12, the DMA operation is started. Accordingly, the character of additional information is read from the character generator 118, and this is given to the magnetic record control circuit 124. Subsequently, magnetic recording of additional information is started. This means that the CPU 102 gives a signal to the motor controller 130 based on an output from the paper size sensor 49 to drive the stepping motor 88, positioning the magnetic writer 66 so that the magnetic writer 66 comes to the position corresponding to the magnetic recording part 2 of the paper 1 in transfer. Thereafter, the magnetic record control circuit 124 converts, into a magnetizing signal, the character code of additional information which is provided by the character generator 118 in synchronism with the pulse from the pulse controller 132, coupling it to the magnetic writer 66. Thereby, the image of the original placed on the original table 14 is electrostatically recorded on the image recording part 3 of the paper 1 in transfer, and subsequently the additional information is magnetically recorded on the magnetic recording part 2.

Subsequently in step S14, a determination is made as to whether or not all of the set additional information is magnetically recorded. If it is determined that the magnetic record of the additional information has not been completed, processing returns to step S10, and the above-described operations in steps S10 through S13 are repeated. On the other hand, if it is determined that all of the set additional information has been magnetically recorded in step S15, the CPU 102 determines whether or not all of the copying operations of an electrophotographic copying machine have been completed, and if so, this processing routine ends.

It should be realized that numerous applications exist for a paper 1 on which an image is electrostatically recorded by a normal copying operation on an image recording part 3 and additional information is magnetically recorded on a magnetic recording part 2. For example, in the case where the content which is electrostatically recorded in a visible fashion differs from the content which is magnetically recorded in an invisible fashion, only confidential matters may be magnetically recorded on the magnetic recording part 2, and only specific persons who are allowed to learn the confidential matters can learn the content which is magnetically recorded utilizing a separate magnetic reader (not illustrated).

Figure 13:
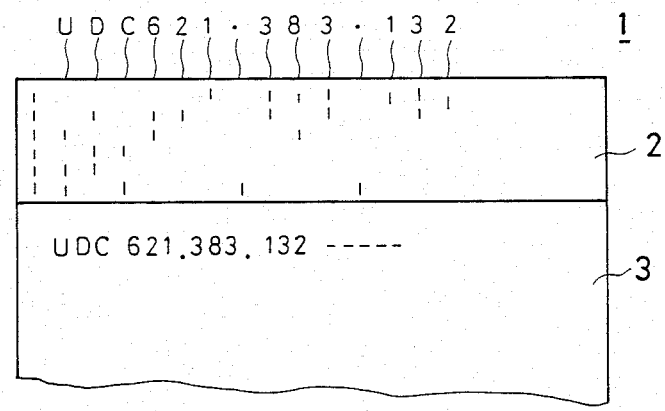
FIG. 13 and FIG. 14 are illustrative views showing application examples of the paper of this embodiment, respectively.

Also, as shown in FIG. 13, in the case where the content which is electrostatically recorded and the content which is magnetically recorded are the same or related to each other, the paper may be processed in various ways such that the content of the magnetic recording part 2 may be read mechanically by the magnetic reader, or the paper 1 is classified or rearranged in a predetermined sequence.

Figure 14:
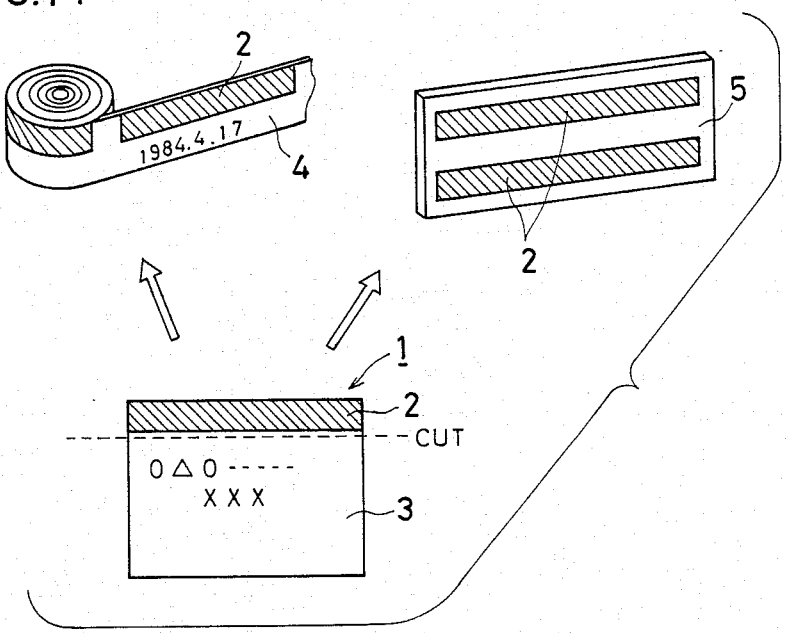

Furthermore, as shown in FIG. 14, it is also possible that only the magnetic recording part 2 may be cut off, stuck on a roll paper 4 to be kept, or the magnetic recording part 2 may be stuck on a resin case 5, and thereby the roll paper 4 or the resin case 5 may be kept. In this case, it will be also possible that the magnetic recording part 2 stuck on the roll paper 4 or the resin case 5 may be read mechanically, and based on this read content, the content of record of the image recording part 3 may be printed by a printer to be utilized as part of an LAN system.

Figure 15:
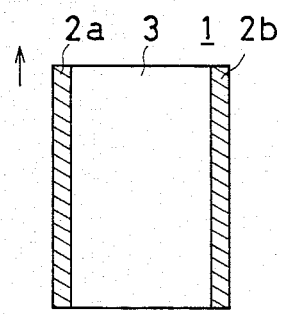
FIG. 15 is a plan view showing another example of the paper applied to the present invention.

FIG. 15 is a plan view showing another example of the image paper applicable to the present invention. The paper 1 in this example is such that two magnetic recording parts 2a and 2b are formed facing each other at both edges of the paper 1 along a side thereof (longitudinal side in illustration). In other words, the direction of advance in copying on the paper 1 is shown by an arrow, and the both edges are of the direction orthogonal to the direction of advance, and the magnetic recording parts 2a and 2b are formed along the direction of advance, respectively. In this embodiment, by forming the magnetic recording parts 2a and 2b along the opposite sides of the paper 1, the quantity of information to be magnetically recorded can be increased in comparison with the example shown in FIG. 1. In this case, as well as in the case of FIG. 5, by making the axial length of the heating roller 70 shorter than that of the pressing roller 72, the contact with to the paper 1 can be maintained during fixing without heating the magnetic recording parts 2a and 2b.

Figure 16:
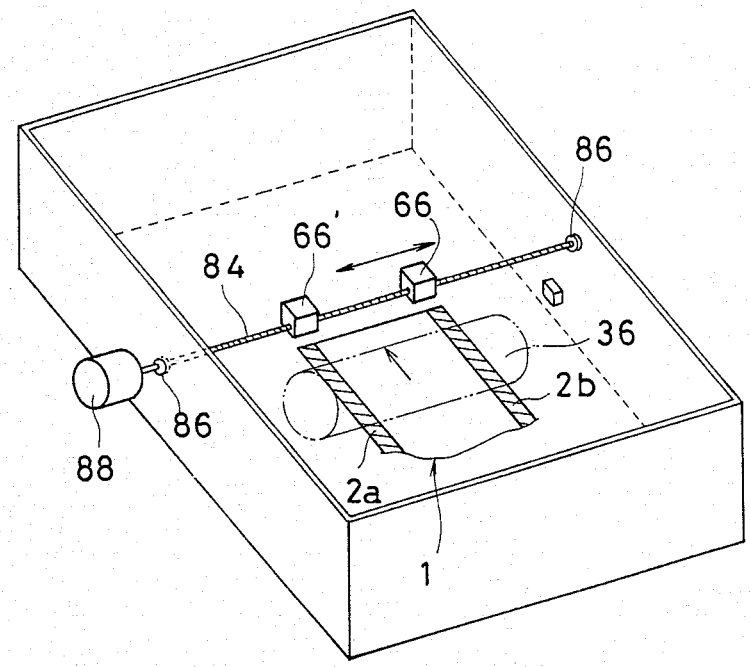
FIG. 16 is a perspective view showing a magnetic recording device of another embodiment in accordance with the present invention utilizing the paper in FIG. 15.

FIG. 16 is a detailed view of the magnetic recording device using the paper illustrated in FIG. 15. A difference between the magnetic recording device of this example and the one in FIG. 6 is that two magnetic writers 66 and 66' are supported by the lead screw 84, and can write to or read from the magnetic recording parts 2a and 2b of the paper 1, respectively. Note that the lead screw 84 is required to be so constructed that the space between the two magnetic writers 66 and 66' is increased or decreased by rotation of the lead screw 84. The center of the axial length of leadscrew 84 always lies between magnetic writers 66 and 66' and therefore the direction of drive of the screw has to be reversed when this center is approached as a boundary.

It should be understood that various modified examples of paper may be considered not limited to the ones as shown in FIG. 1 and FIG. 15.

FIG. 17A through FIG. 17F are plan views showing different examples of paper applicable to the present invention.

Figure 17A:
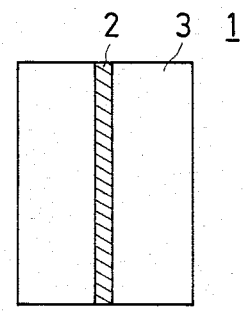
FIG. 17A through FIG. 17F are plan views showing different examples of the paper applied to the present invention respectively, and particularly

An example in FIG. 17A is a paper 1 whereon the magnetic recording part 2 is formed at the center part thereof.

Figure 17B:
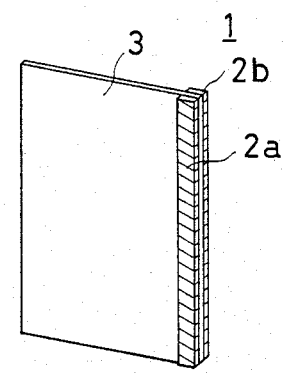

An example in FIG. 17B is a paper 1 whereon the magnetic recording parts 2a and 2b are formed on both faces along one side. By this structure, additional information associated with the respective faces can be magnetically recorded even in the case where the copying is performed on both faces of the paper 1.

Figure 17C:
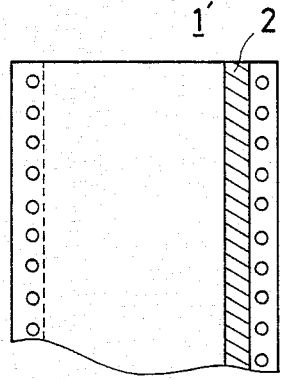

In an example in FIG. 17C, a continuous paper 1' is used. The magnetic recording part 2 is formed along a machine-sewn line which is formed to separate sprocket holes from the paper part in this continuous paper 1'. By this arrangement, additional information can be magnetically recorded on the continuous paper 1'. In this case, the paper can be used also for the printer of a word processor, computer or the like, not only for the paper of an electrophotographic copying machine 10. As shown in FIG. 15, two magnetic recording parts may be formed at both sides of the continuous paper along the direction of advance.

Figure 17D:
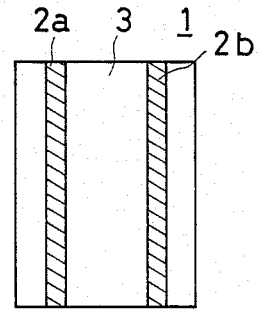

Unlike the case of FIG. 15, an example in FIG. 17D is a paper 1 whereon the two magnetic recording parts 2a and 2b are formed inside from the end edge of the side thereof.

Figure 17E:
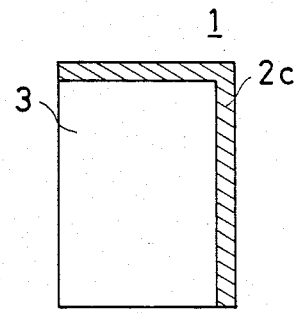

An example in FIG. 17E is a paper 1 whereon the magnetic recording part 2c is formed at both one side and the side orthogonal thereto, that is, in an L-shape. By this arrangement, the paper 1 can be utilized in either case where the direction of advance or feed of the paper 1 is longitudinal or transversal.

The magnetic recording part may be formed in a cross shape as a modified example of forming the magnetic recording parts in the direction of advance and in the direction orthogonal thereto, respectively. In the case of a paper whereon the magnetic recording part is formed in a cross shape, when the magnetic writer is fixed at the center position, irrespective of whether the direction of advance of the paper is longitudinal or transversal, the magnetic writer is not required to be moved even if the paper size is changed.

Figure 17F:
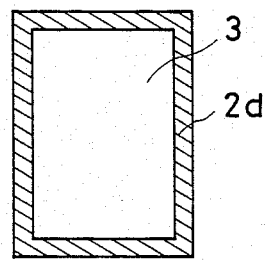

An example in FIG. 17F is a paper 1 whereon a magnetic recording part 2d is formed in a picture-frame shape along the end edge of each side thereof. By forming the magnetic recording part 2d in such a fashion, the paper 1 can be fed in either longitudinal or transversal direction, and the directionality is removed in storing the copy paper in the paper feeding cassette. In that case, no restriction is imposed on the direction of feeding the paper or on storing it.

In the various embodiments described previously, the magnetic recording part has been described as formed on the paper, with the width of the magnetic recording part selected arbitrarily. The magnetic recording part also may be formed over the whole of one face of the paper 1.

Figure 17G:
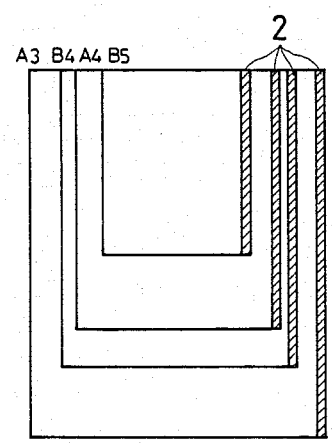
FIG. 17G shows an example in the case where the paper size differs.

An example in FIG. 17G shows the cases where the magnetic recording part 2 is formed at the right end of different-sized papers, respectively.

FIG. 18 illustrates another example of the electrophotographic copying machine. In the example of the electrophotographic copying machine shown in FIG. 1, only a predetermined content can be magnetically recorded as additional information. On the other hand, in this example, arbitrary information can be magnetically recorded as additional information by providing a so-called word processing function. For this purpose, alphanumeric keys 134 are arranged on the operation panel of the main unit 12 of the copying machine 10. These alphanumeric keys 134 comprise a plurality of keys corresponding to numerals 0-9, alphabet A-Z and other symbols. Furthermore, an LCD panel 136 is provided together with the display panel 28 as shown in FIG. 7. This LCD panel 136 is a dot-matrix display. In this example, the number displaying part 28b (FIG. 10) of the display panel 28 can be dispensed with.

A brief description will now be provided of system operation for the case where additional information is magnetically recorded by the word processing function in reference to FIG. 11 and FIG. 18. Additional information to be magnetic-recorded is entered in the magnetic recording part 2 by operating the alphanumeric keys 134. A key code based onn operation of these alphanumeric keys 134 is provided to the CPU 102 through the bus 112. The CPU 102 stores the key codes in the RAM 106 in the sequence of input. The additional information thus inputted based on the word processing function is read from the RAM 106 in response to being operation of the start key 26, being and is coupled directly to the magnetic record control circuit 124 through the bus 112. Therefore, in association with the copying operation, the magnetic record control circuit 124 provides a magnetizing signal corresponding to the additional information to the magnetic writer 66 to write to the magnetic recording part 2 of the paper 1.

Such a word processing function is disclosed in the co-pending U.S. patent application Ser. No. 683,781, filed Dec. 19, 1984, now U.S. Pat. No. 4,578,316 which was assigned to the assignee of the present invention.

Figure 19A:
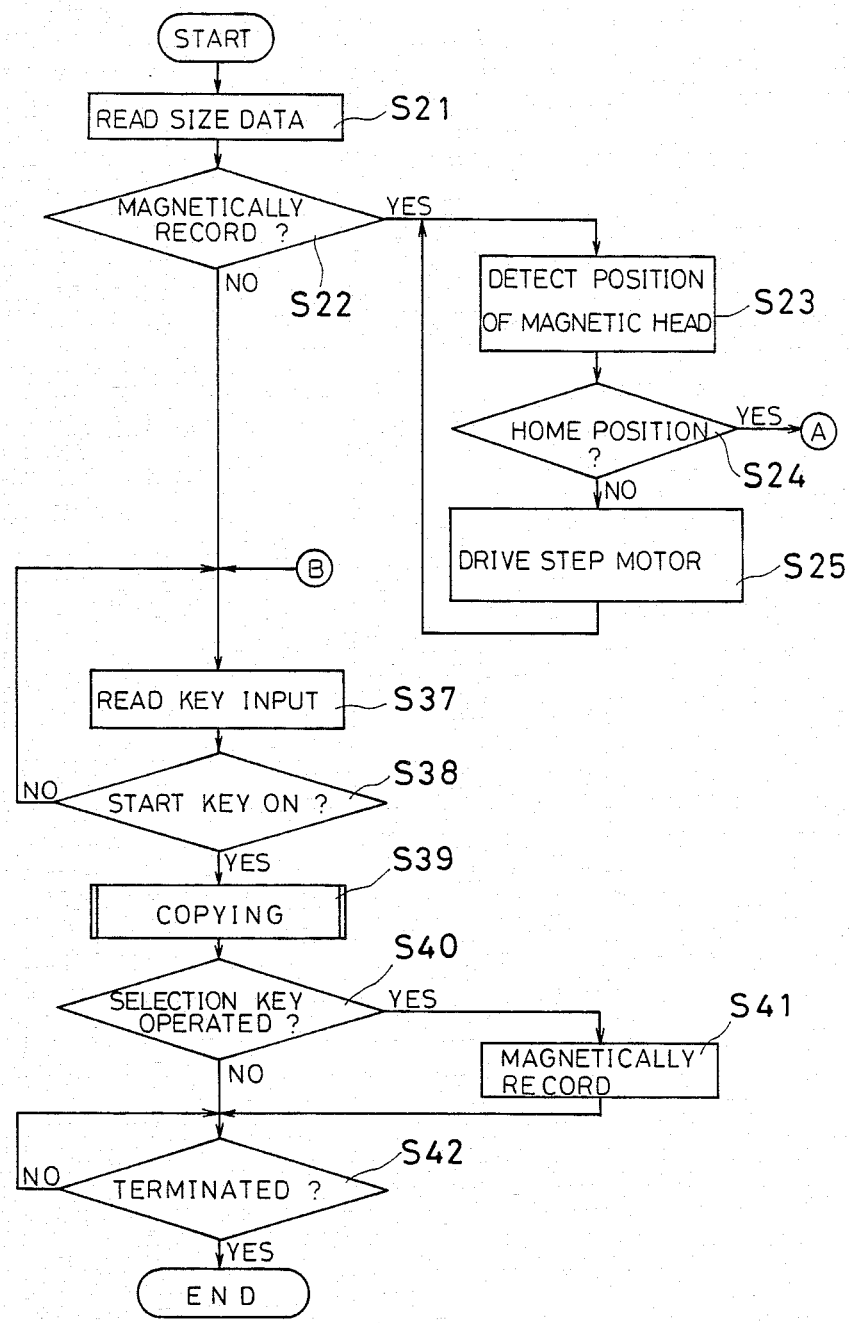

FIG. 19A and FIG. 19B are flowcharts for explaining operation of another embodiment. As shown in FIG. 17G, this example relates to magnetically recording additional information always at an appropriate position, that is, at the position at which the magnetic recording part is formed, for copy papers of different sizes.

In this embodiment, as shown in FIG. 2, the paper size sensor 49 is associated with the paper feeding cassette 16. This paper size sensor 49 comprises a means for reading a size displaying part (not illustrated) formed in the paper feeding cassette 16 in a mechanically readable fashion.

If this size displaying part is, for example, a protrusion representing the paper size by the position at which it is formed, then, a microswitch having an actuator operated by such a protrusion is suitable for the paper size sensor 49. A detection output of the paper size sensor 49 is coupled to the CPU 102 as a signal representing each paper size, "B5", "A4" or "B4" through the copy mechanism part 110, the PIO 108 and the bus 112. Furthermore, in this example, an encoder 140 is utilized. This encoder 140 is installed associated with the stepping motor 88 for rotating the lead screw 84, and a predetermined number of pulses are outputted every revolution of the stepping motor 88. A pulse train from this encoder 140 is inputted to the CPU 102 through the copy mechanism part 110. Accordingly, the CPU 102 can detect the stop position of the magnetic writer (or the magnetic reader) based on the pulse train from the encoder 140. CPU 102 drives the stepping motor 88 based on this detected position, and thereby can move the magnetic writer to the position corresponding to the magnetic recording part 2 of the paper 1.

Next, a description is provided relating to the operation for changing the position of the magnetic writer 66 in response to the size of the paper as shown in FIG. 17G based on FIG. 19A and FIG. 19B.

In the first step S21, based on a signal from the paper size sensor 49, the kind of paper feeding cassette 16 loaded at that time, that is, the size data of the paper 1 is taken into the CPU 102. In step S22, based on a key input from the key-matrix 122, a determination is made as to whether or not magnetic recording of additional information has been commanded. If it is determined that additional information is to be magnetically recorded, processing proceeds to step S23. In step S23, the position of the magnetic writer 66 (and/or the magnetic reader 54) is detected, and in step S24, a determination is made as to whether or not the magnetic writer 66 is located at the home position, that is, the reference position. In addition, this determination can be made based on the counted value of the output pulses of the encoder 140. If the magnetic writer 66 is not located at the reference position, a control signal is coupled from the CPU 102 to the motor control part 130 in step S25. Accordingly, the motor control part 130 couples driving pulses to the stepping motor 88, positioning the magnetic writer 66 at the reference position.

If it is determined that the magnetic writer 66 has been positioned at the reference position, driving of the stepping motor 88 is stopped in step S26.

Subsequently, the CPU 102 determines the paper size based on a signal from a paper size sensor 138. If it is determined that the size of the paper is "B5" in step S27, the number of pulses equivalent to the amount of movement of the magnetic writer 66 responding to the size "B5", that is, the number of pulses supplied to the stepping motor 88 is set as a count value (C1) into a counter (not illustrated) installed in a predetermined area of the RAM 106 in the following step S28.

On the other hand, if it is determined that the size of the paper is not "B5", a determination is made as to whether or not the size is "A4" in the next step S29. If it is determined that the size is "A4", the number of pulses equivalent to the amount of movement of the magnetic writer 66 corresponding to the size "A4" is set as a count number "C2" into the above-described counter.

If it is determined that the size is not "A4", a determination is made that the size at that time is "B4", and in step S31, a count value (C3) corresponding to the size "B4" is set into the counter.

Thereafter, in step S32, a drive command signal is coupled to the motor control part 130 from the CPU 102, and the stepping motor 88 is energized. In response to rotation of the stepping motor 88, pulses from the encoder 140 are coupled to the CPU 102 in step S33. Subsequently, in step S34, a determination is made as to whether or not the number of pulses from the encoder 140 coincides with the count value C1, C2 or C3 set in the above-described step S28, S30, or S31 and the stepping motor 88 continues to be energized until the number of pulses reaches the counter value.

If coincidence is detected in step S34, the drive command signal to the motor control part 130 is stopped in step S35 and rotation of the stepping motor 88 is stopped in step S36.

In this state, the magnetic writer 66 is positioned at the position corresponding to the magnetic recording part 2 in response to the size of the paper to be fed. Thus, as shown in FIG. 17G, additional information can be magnetically recorded on the position of the magnetic recording part 2 corresponding to the paper size. This so even in the case where the position of the magnetic recording part 2 with respect to the axial direction of the photosensitive drum 36 differs depending upon the paper size.

Thereafter, in step S37, the key input is received. Subsequently, in step S38, a determination is made as to whether or not the start key 28 has been operated and the operations of step S37 and step S38 are repeated until the start key 26 is operated. Then, if the start key 26 is operated, in step S39, a signal is coupled to the copying mechanism part 110 through the PIO 108 and the normal copying operation is performed.

Subsequently, in step S40, a determination is made as to whether or not an input has been provided by any one of keys in the group of select keys 24. If it is determined that any one of the keys of the group of select keys 24 has been operated, in the following step S41, as explained previously in FIG. 12, additional information is given to the magnetic record control circuit 124. Magnetic recording is performed on the magnetic recording part 2 of the paper 1 by the magnetic writer 66. Thereafter, in step S40, if it is determined that no input has been provided by keys in the group of select keys 24, in step S42, processing is suspended until the copying operation is completed. If it is determined that the copying operation has been completed, a series of operations are terminated.

Thus, even in the case where the position of the magnetic recording part 2 of the paper differs in the axial direction of the photosensitive drum 36 depending upon the paper size, the position of the magnetic writer 66 is positioned automatically and additional information can be magnetically recorded on the magnetic recording part 2.

Figure 20:
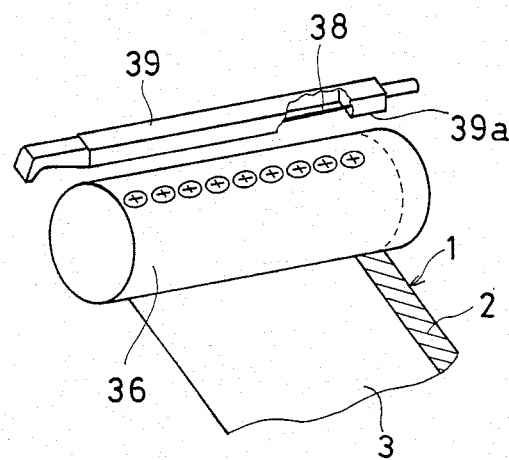
FIG. 20 is an illustrative view showing the major part of another embodiment in accordance with the present invention for preventing the magnetic recording part from adhesion of toner.

FIG. 20 shows an embodiment for preventing adhesion of toner onto the magnetic recording part 2 of the paper. In this embodiment, the shape of a shield plate 39 of the charging corotron 38 is arranged to form a cover 39a. This cover 39a, prevents charging on that part of the photosensitive drum 36 which corresponds to cover 39a. Accordingly, in accordance with this embodiment, no electrostatic latent image is formed on this part of drum 36 and by positioning the cover 39a above magnetic recording part 2, adhesion of toner to that area of the photosensitive drum 36 does not take place and adhesion of toner to the magnetic recording part 2 can be effectively prevented. Accordingly, the magnetic signal formed on the magnetic recording part 2 is not affected by a magnetic material in contained the toner or the carrier.

In the in FIG. 20 embodiment, in order to prevent an unnecessary adhesion of toner, a part of the photosensitive drum 36 is made not to be charged. However, it is also possible that after charging by the charging corotron 38, charges on the undesired part are removed. For this purpose, as shown in FIG. 2, for example, a partial charge-removing device 35 such as a lamp has only to be installed. This partial charge-removing device 35 will be required to be disposed upstream from the developing device 40 and downstream from the charging corotron 38. Then, it is needless to say that this position has to be the position corresponding to the magnetic recording part 2 of the paper 1 in the direction of width of the photosensitive drum 36. Thus, a similar effect to that of the FIG. 20 embodiment can be expected.

Figure 21:
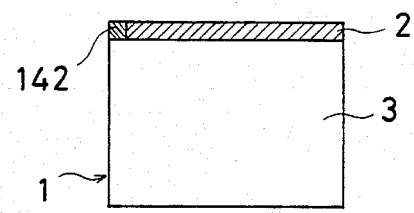
FIG. 21 is a plan view showing still another example of the paper.
Figure 22:
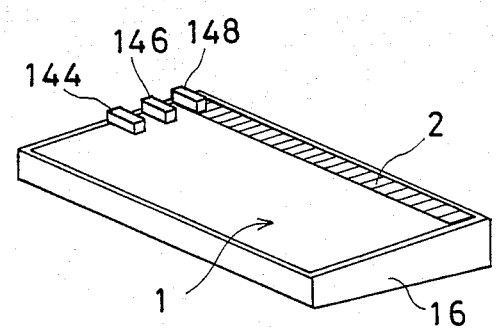
FIG. 22 is a perspective view showing an example of a paper feeding cassette using the paper as illustrated in FIG. 21.

FIG. 21 is a plan view showing another example of the paper applicable to the present invention. In this paper 1, a magnetic part 142 is formed at one end of the magnetic recording part 2. Then, in the case where the paper 1 as shown in this embodiment is used, the paper feeding cassette 16 as shown in FIG. 22 is used. In this paper feeding cassette 16, for example, magnetic detectors 114, 146 and 148 such as Hall elements are installed. These magnetic detectors 144-148 detect the size of the paper 1 by detecting the above-described magnetic part 142. This means that when the paper 1 as shown in FIG. 21 is stored in the paper feeding cassette 16 as shown in FIG. 22, the magnetic part 142 is detected by any one of the magnetic detectors 144–148. Accordingly, in the control part, the size of the paper 1 at that time can be known by the magnetic detector wherefrom the signal has been obtained. Then, in response to the size thus detected, a determination is made as to the part of the photosensitive drum 36 from which charge is to be removed and the position of light emission of an LED array 150 for removing charge as shown in FIG. 23 is controlled.

Figure 23:
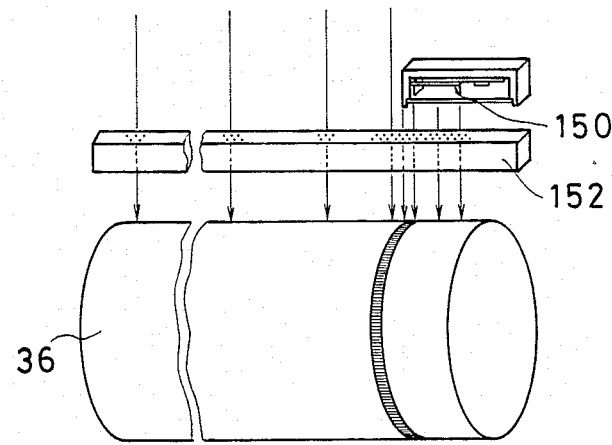
FIG. 23 is an illustrative view showing the major part of still another embodiment in accordance with the present invention which uses the paper as illustrated in FIG. 21 and prevents the magnetic recording part from adhesion of toner.

More specifically, in FIG. 23 embodiment, the LED array 150 is installed above the photosensitive drum 36 in a manner capable of moving in the direction of the width of the photosensitive drum 36. Under this LED array 150, a short focal length lens array 152 is installed extending in the same direction as the array 150. Accordingly, by emitting the light of this LED array 150, charges on the photosensitive drum 36 at that part can be removed. In response to a signal from any one of the magnetic detectors 144–148 a shown in FIG. 22, the LED array 150 emits light while moving, and thereby the part of the photosensitive drum 36 corresponding to the position of the magnetic recording part 2 corresponding to the size of the paper 1 can be charge-removed.

Figure 24:
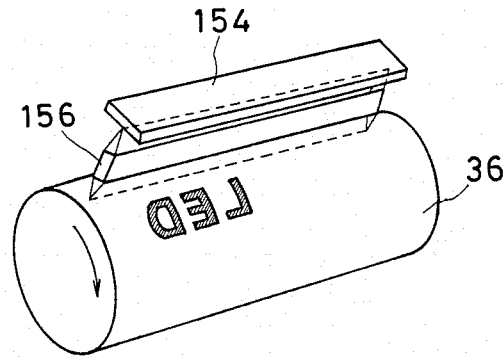
FIG. 24 is a perspective view of the major part showing another example of an electrostatic latent image forming means.

FIG. 24 is a perspective view of the major part showing an embodiment wherein an LED array is used in part of an electrostatic latent image forming means. Such an LED array 154 is disclosed in the U.S. patent application Ser. No. 683,791 as cited previously. Under this LED array 154, a short focal length lens array 156 similar to the one as shown in FIG. 2 is disposed between the photosensitive drum 35 and LED array 154. When the LED array 154 is driven by a signal from an electric signal generating means (not illustrated) according to a visible image, a light image corresponding to the visible image from the LED array 154 is outputted, and is converged on the photosensitive drum 36 by the short focal length lens array 156. Accordingly, an electrostatic latent image is formed on the photosensitive drum 36.

In order to partly remove the charges on the photosensitive drum 36 as described above, this LED array 154 constituting part of a latent image forming means may be utilized. For this purpose, in the part corresponding to the magnetic recording part 2 of the paper 1, all light emitting elements comprised in the LED array 154 has only to be lighted, that is, that part of the photosensitive drum 36 have only to be exposed entirely.

Figure 25:
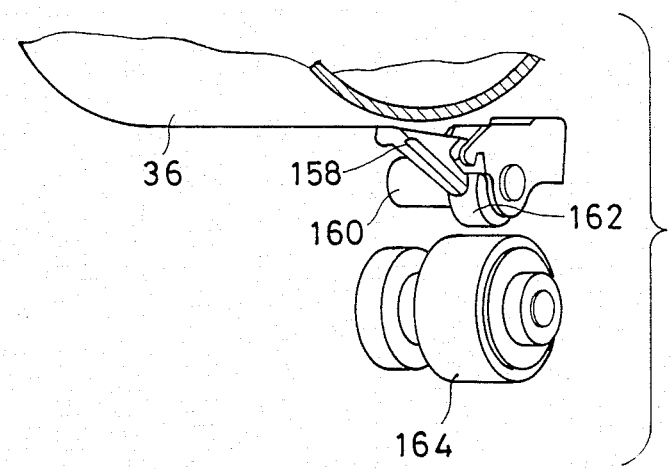
FIG. 25 is an illustrative view showing the major parts of still another embodiment in accordance with the present invention for preventing the magnetic recording part from adhesion of toner.
Figure 26:
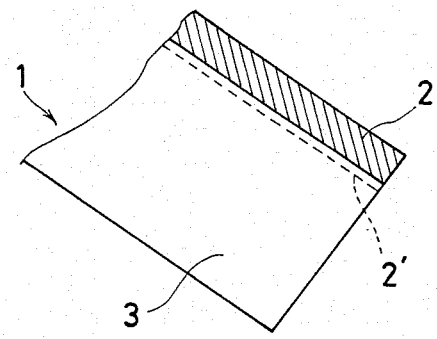
FIG. 26 is an illustrative view for showing an operation of FIG. 25.

FIG. 25 is a partial perspective view showing another embodiment in accordance with the present invention for preventing adhesion of toner on the magnetic recording part 2 of the paper. In this embodiment, a peeling claw is utilized as a toner adhesion preventing means. The peeling claw 158 is fixed to a roller 160 which is attached rotatably to a supporting shaft installed in the copying machine main unit. A driving roller 162 is brought in press-contact with such a roller 160. The paper 1 whereon the toner image is transferred can be peeled from the photosensitive drum 36 by the peeling claw 158. This peeling claw 158 contacts a contact part 2' as shown by a dotted line in FIG. 26. As a result, as shown in FIG. 25, the toner adhering to the magnetic recording part 2 is removed or scraped off by this peeling claw 158.

Figure 27:
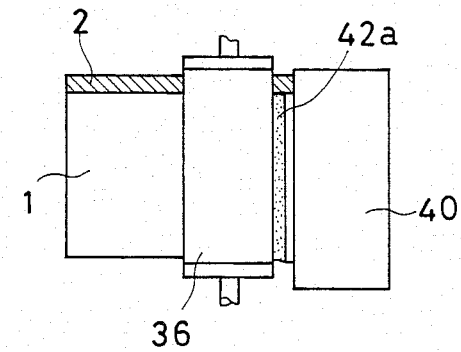
FIG. 27 is an illustrative view showing the major part of another embodiment in accordance with the present invention for preventing the magnetic recording part from adhesion of toner.

FIG. 27 is an illustrative view showing the major part of still another embodiment in accordance with the present invention and likewise the previous embodiment. This is an embodiment for preventing adhesion of toner on the magnetic recording part of the paper. The electrostatic latent image formed on the photosensitive drum 36 as described above is developed as a toner image by the developing device 40. A magnetic brush 42a for toner is formed in this developing device 40 so that no "crest" is present at the position corresponding to the magnetic recording part 2 of the paper 1. As shown in FIG. 27, the tip of the magnetic brush 42a for toner of the developing device 40 never contacts with the position corresponding to the magnetic recording part 2 of the photosensitive drum 36.

Figure 28:
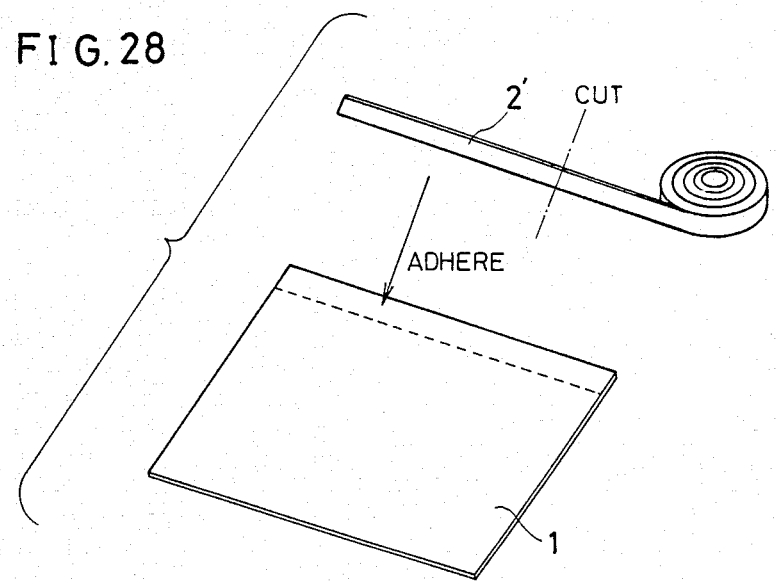
FIG. 28 through FIG. 32 are illustrative views for showing formation of the magnetic recording part by sticking a magnetic tape, respectively.
Figure 29:
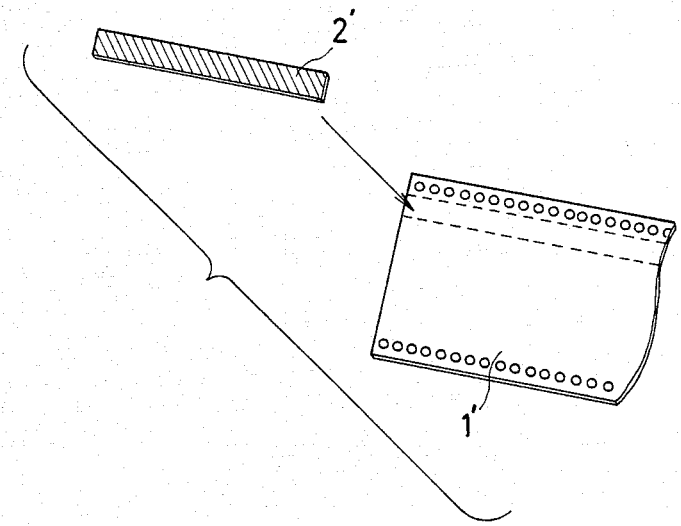

FIG. 28 and the following figures are illustrative views showing different examples of the method of forming the paper applicable to the present invention.

For the paper 1, the magnetic recording part 2 can be formed in a manner that a magnetic tape 2' cut in an appropriate length is stuck to a plain paper as shown in FIG. 28. In this case, it is needless to say that the position of the magnetic recording part 2, that is, the position whereon the magnetic tape 2' is stuck has to be the position where the above-described processing by the magnetic reader 54 or the magnetic writer 66 can be made.

Also, by sticking a magnetic tape prepared separately from the paper 1 in such a manner, required data, for example, the number of facsimile, confidential matters and the like can be written thereto in advance, therefore being very convenient.

A paper suitable for magnetic recording can be further fabricated as shown in FIG. 29 through FIG. 32. In an example in FIG. 29, the magnetic tape 2' is stuck to paper of continuous form 1' which is used, for example, for a computer, word processor or the like. In this case, the magnetic tape 2' is to be stuck inside from the feeding holes of the paper 1' so as not to cover them.

Figure 30:
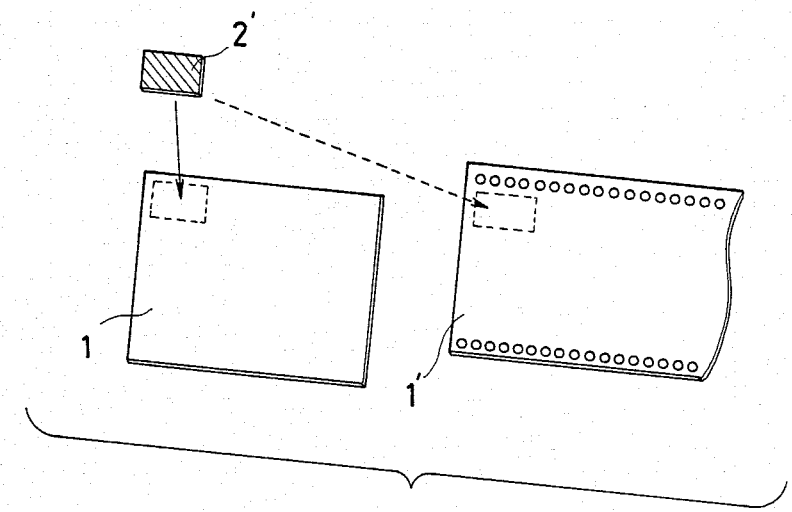

Also, in a case where the amount of magnetic information to be recorded is small, as shown in FIG. 30, the magnetic tape 2' with a relatively small area may be utilized.

Figure 31:
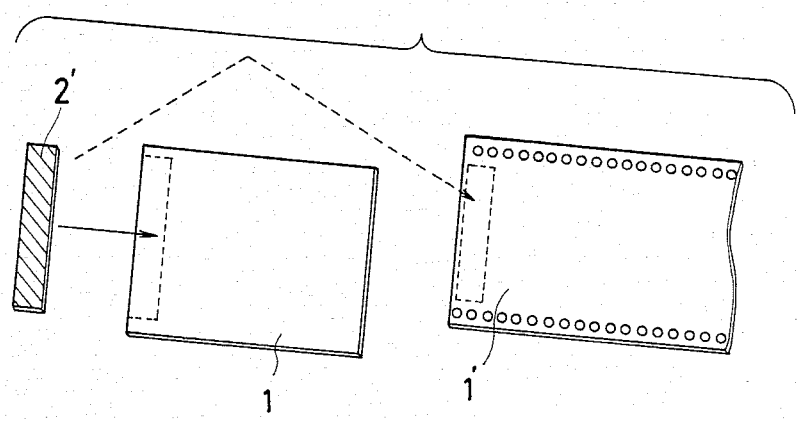

Furthermore, in the case where magnetic information is required to be read prior to a visible image such as the number of a facsimile, as shown in FIG. 31, the tape may be stuck at the tip part of the paper 1 or 1' extending in the direction of the width. In the case where the magnetic tape 2' is stuck in such a direction, the magnetic reader 54 or the magnetic writer 66 has to be able to move along this direction as shown previously in FIG. 6.

Figure 32:
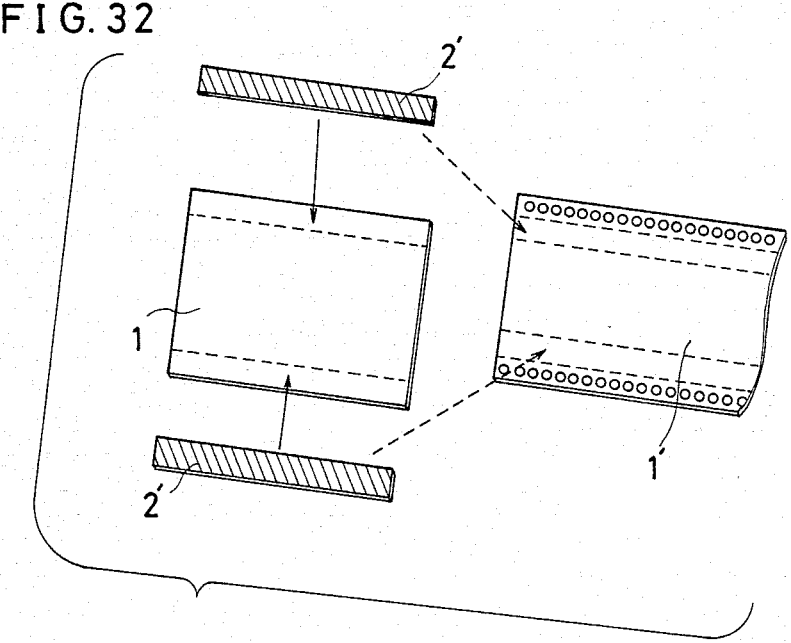

FIG. 32 shows the case where two sheets of magnetic tapes 2' are stuck and thereby the paper as shown in FIG. 15 or FIG. 17 is fabricated.

Meanwhile, in any embodiment as described above, the magnetic recording part 2 which is formed on or stuck to the paper 1 or 1' is preferably colored in white or a color near it. Because, in the case where that paper 1 is used as an original of the electrophotographic copying machine, if this magnetic recording part 2 is of a dark color such as brown or black, that part is copied as a black image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus, comprising
   a paper feeding means for feeding paper in a predetermined paper feeding path, said paper having a visible image recording part and a magnetic information recording part,
   a visible image recording means disposed in said paper feeding path for recording a visible image on said visible image recording part of said paper fed by said paper feeding means,
   a magnetic recording means disposed in said paper feeding path for recording magnetic information on said magnetic information recording part of said paper fed by said paper feeding means, and
   a discharging means for discharging paper on which said visible image is recorded by said visible image recording means in said visible image recording part and magnetic information is recorded by said magnetic recording means in said magnetic information recording part.

2. An image forming apparatus in accordance with claim 1, further comprising a demagnetizing means disposed in said paper feeding path upstream from said magnetic recording means for erasing said magnetic information recording part of said paper.

3. An image forming apparatus in accordance with claim 2, further comprising a magnetic reading means disposed in said paper feeding path upstream from said demagnetizing means for magnetically reading said magnetic information recording part of said paper.

4. An image forming apparatus in accordance with claim 1, wherein said visible image recording means comprises a latent image forming means for forming a latent image of a visible image to be recorded, a developing means for developing said latent image into a toner image, and a transferring means for transferring said toner image onto said visible image recording part of said paper.

5. An image forming apparatus in accordance with claim 4, which further comprises a visible image generating means for generating a visible image to form said latent image by said latent image forming means.

6. An image forming apparatus in accordance with claim 5, wherein said latent image forming means comprises a photosensitive body, and said visible image generating means comprises a light source for irradiating an original and a lens means for converging an original image reflected from said original on said photosensitive body.

7. An image forming apparatus in accordance with claim 5, wherein said visible image generating means comprises means for generating an electric signal corresponding to a visible image, a light emitting elements head wherein a large number of light emitting elements driven by said electric signal are disposed and a photosensitive body receiving a light image from said emitting elements head.

8. An image forming apparatus in accordance with claim 5, which further comprises an information generating means for generating information to be written on said magnetic recording part of said magnetic recording means.

9. An image forming apparatus in accordance with claim 8, wherein said information generating means comprises means for storing or recording plural kinds of information and a means for selecting said plural kinds of information.

10. An image forming apparatus in accordance with claim 9, which further comprises a displaying means for displaying selected information.

11. An image forming apparatus in accordance with claim 4, which further comprises a toner adhesion preventing means for preventing adhesion of toner on said magnetic recording part of said paper.

12. An image forming apparatus in accordance with claim 11, wherein said toner adhesion preventing means is installed associated with said developing means and comprises means for preventing toner from contacting with said magnetic recording part.

13. An image forming apparatus in accordance with claim 11, wherein said latent image forming means comprises a photosensitive body and a charging means for charging said photosensitive body, and
said toner adhesion preventing means comprises a charge controlling means for substantially preventing deposit of charge on said magnetic recording part of said paper.

14. An image forming apparatus in accordance with claim 13, wherein said charge controlling means comprises means for preventing an area of photosensitive body corresponding to said magnetic recording part from being charged.

15. An image forming apparatus in accordance with claim 13, wherein said charge controlling means comprises a discharging means for discharging charges charged on an area of said photosensitive body corresponding to said magnetic recording part.

16. An image forming apparatus in accordance with claim 15, wherein said discharging means comprises a partial irradiation means for irradiating a light to an area of said photosensitive body corresponding to said magnetic recording part.

17. An image forming apparatus in accordance with claim 16, wherein said partial irradiation means is movable in the direction of the width of said photosensitive body.

18. An image forming apparatus in accordance with claim 16 which comprises an array of light emitting elements for forming a light image according to said visible image on said photosensitive body and wherein said partial irradiation means comprises part of said array of light emitting elements.

19. An image forming apparatus in accordance with claim 13, which further comprises a peeling claw for separating said paper from said photosensitive body, and wherein said toner adhesion preventing means comprises said peeling claw.

20. An image forming apparatus in accordance with claim 4, which further comprises a fixing means for thermo-fixing said toner image transferred on said visible image recording part of said paper.

21. An image forming apparatus in accordance with claim 20, wherein said fixing means comprises a heat preventing means for preventing said magnetic recording part of said paper from being heated.

22. An image forming apparatus in accordance with claim 21, wherein said heat preventing means comprises a heating means for heating only said visible image recording part of said paper.

23. An image forming apparatus in accordance with claim 22, wherein said heating means comprises a heating roller which contacts only with said visible image recording part of said paper and does not contact with said magnetic recording part.

24. An image forming apparatus in accordance with claim 4, which further comprises a paper feeding means for feeding said transferring means with said paper and means associated with said paper feeding means for detecting whether or not said magnetic recording means exists on said paper to be fed.

25. An image forming apparatus in accordance with claim 4, wherein said magnetic recording means is disposed in said paper feeding path downstream from said transferring means.

26. An image forming apparatus in accordance with claim 25, which further comprises a demagnetizing means disposed in said paper feeding path upstream from said transferring means for erasing said magnetic information recording part of said paper.

27. An image forming apparatus in accordance with claim 26, which further comprises a magnetic reading means disposed in said paper feeding path downstream from said magnetic recording means for magnetically reading said magnetic information recording part of said paper.

28. An image forming apparatus comprising
a transferring means for transferring a paper having a visible image recording part and a magnetic information recording part,
a visible image recording means for recording a visible image on said visible image recording part of said paper transferred by said transferring means,
a magnetic recording means for recording a magnetic signal on said magnetic information recording part of said paper transferred by said transferring means,
said visible image recording means comprises a latent image forming means for forming a latent image of a visible image to be recorded, a developing means for developing said latent image into a toner image, and a transferring means for transferring said toner image onto said visible image recording part of said paper, and a paper feeding means for feeding said transferring means with said paper and means for detecting whether or not said magnetic recording means exists on said paper to be fed and associated with said paper feeding means.

29. An image forming apparatus in accordance with claim 28, which further comprises a magnetic part formed on said paper having said magnetic recording part, and wherein said detecting means comprises a magnetic sensor for detecting said magnetic part.

30. An image forming apparatus in accordance with claim 29, wherein said magnetic part is formed at a different position for each size of paper, and said magnetic sensor is disposed corresponding to that different position.

31. An image forming apparatus, comprising
a paper feeding means for feeding paper having a visible image recording part and a magnetic information recording part in a predetermined paper feeding path,
a visible image recording means disposed in said paper feeding path for recording a visible image on said visible image recording part of said paper fed by said paper feeding means,
a magnetic recording means disposed in said paper feeding path for recording magnetic information on said magnetic information recording part of said paper fed by said paper feeding means,
a discharging means for discharging paper on which said visible image is recorded by said visible image recording means in said visible image recording part and magnetic information is recorded by said magnetic recording means in said magnetic information recording part,
said visible image recording means comprises a latent image forming means for forming a latent image of a visible image to be recorded, a developing means for developing said latent image into a toner image, and a transferring means for transferring said toner image onto said visible image recording part of said paper, and
a paper feeding means for feeding said transferring means with said paper and means for detecting whether or not said magnetic recording means exists on said paper to be fed and associated with said paper feeding means.

32. An image forming apparatus in accordance with claim 31, further comprising a magnetic part formed on said paper having said magnetic recording part, and wherein said detecting means comprises a magnetic sensor for detecting said magnetic part.

33. An image forming apparatus in accordance with claim 32, wherein said magnetic part is formed at a different position for each size of paper, and said magnetic sensor is disposed corresponding to that different position.

34. An image forming apparatus, comprising
a paper feeding means for feeding paper having a visible image recording part and a magnetic information recording part in a predetermined paper feeding path,
a visible image recording means disposed in said paper feeding path for recording a visible image on said visible image recording part of said paper fed by said paper feeding means,
a magnetic reading means disposed in said paper feeding path for reading magnetic information recorded on said magnetic information recording part of said paper fed by said paper feeding means, and
a discharging means for discharging paper on which said visible image is recorded by said visible image recording means in said visible image recording part.

35. An image forming apparatus in accordance with claim 34, wherein said visible image recording means comprises a latent image forming means for forming a latent image of a visible image to be recorded, a developing means for developing said latent image into a toner image and a transferring means for transferring said toner image onto said visible image recording part of said paper.

36. An image forming apparatus in accordance with claim 35, which further comprises a magnetic writing means for writing a magnetic signal to said magnetic information recording part of said paper transferred by said transferring means.

37. An image forming apparatus in accordance with claim 36, which further comprises a demagnetizing means for erasing the content of said magnetic information recording part of said paper transferred by said transferring means.

38. An image forming apparatus in accordance with claim 35, further comprising a magnetic writing means for writing magnetic signal into said magnetic information recording part of said paper fed by said paper feeding means.

39. An image forming apparatus in accordance with claim 38, further comprising a demagnetizing means for erasing content of said magnetic information recording part of said paper fed by said paper feeding means.

40. An image forming apparatus, comprising
a paper feeding means for feeding paper having a visible image recording part and a magnetic information recording part in a predetermined paper feeding path,
a visible image recording means disposed in said paper feeding path for recording a visible image on said visible image recording part of said paper fed by said paper feeding means,
at least one of a magnetic recording means disposed in said paper feeding path for recording magnetic information on said magnetic information recording part of said paper fed by said paper feeding means and a magnetic reading means disposed in said paper feeding path for reading magnetic information recorded on said magnetic information recording part of said paper fed by said paper feeding means, and
a discharging means for discharging paper on which said visible image is recorded by said visible image recording means in said visible image recording part and magnetic information is recorded by said magnetic recording means in said magnetic information recording part.

41. An electrophotographic copying machine, comprising
a paper feeding means for feeding paper having a visible image recording part and a magnetic information recording part in a predetermined paper feeding path,
a latent image forming means for forming a latent image of a visible image to be recorded, a developing means for developing said latent image into a toner image, a transferring means for transferring said toner image onto said visible image recording part of said paper fed by said paper feeding means in said paper feeding path, and a magnetic recording means disposed in association with said paper feeding path for recording a magnetic signal on said magnetic information recording part of said paper fed by said paper feeding means.

42. An electrophotographic copying machine, comprising a paper feeding means for feeding paper having a visible image recording part and a magnetic information recording part in a predetermined paper feeding path, a latent image forming means for forming a latent image of a visible image to be recorded, a developing means for developing said latent image into a toner image, a transferring means for transferring said toner image onto said visible image recording part of said paper fed by said paper feeding means in said paper feeding path, and a magnetic reading means disposed in association with said paper feeding path for reading magnetic information recorded on said magnetic information recording part of said paper fed by said paper feeding means.

43. An electrophotographic copying machine, comprising a paper feeding means for feeding paper having a visible image recording part and a magnetic information recording part in a predetermined paper feeding path, a latent image forming means for forming a latent image of a visible image to be recorded, a developing means for developing said latent image into a toner image, a transferring means for transferring said toner image onto said visible image recording part of said paper fed by said paper feeding means in said predetermined feeding path, and at least one of a magnetic recording means disposed in said paper feeding path for recording magnetic information on said magnetic information recording part of said paper fed by said paper feeding means and a magnetic reading means disposed in said paper feeding path for magnetically reading magnetic information recorded on said magnetic information recording part of said paper fed by said paper feeding means, and a discharging means for discharging paper on which said visible image is recorded by said visible image recording means in said visible image recording part and magnetic information is recorded in said magnetic information recording part.

* * * * *